US009745485B2

United States Patent
Ito et al.

(10) Patent No.: US 9,745,485 B2
(45) Date of Patent: Aug. 29, 2017

(54) WATER-BASED INK FOR INK-JET RECORDING, INK CARTRIDGE, AND INK-JET RECORDING METHOD

(71) Applicant: Brother Kogyo Kabushiki Kaisha, Nagoya-shi, Aichi-ken (JP)

(72) Inventors: Shinpei Ito, Nagoya (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/867,444

(22) Filed: Sep. 28, 2015

(65) Prior Publication Data

US 2016/0289475 A1 Oct. 6, 2016

(30) Foreign Application Priority Data

Mar. 31, 2015 (JP) ................................. 2015-073803

(51) Int. Cl.

| C09D 11/322 | (2014.01) |
| C09D 11/38 | (2014.01) |
| C09D 1/00 | (2006.01) |
| C09D 11/30 | (2014.01) |

(52) U.S. Cl.
CPC ................ C09D 11/38 (2013.01); C09D 1/00 (2013.01); C09D 11/30 (2013.01); C09D 11/322 (2013.01)

(58) Field of Classification Search
CPC .............................. C09D 11/30; C09D 11/322
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 7,819,962 | B2 | 10/2010 | Gu |
| 7,922,805 | B2 | 4/2011 | Kowalski et al. |
| 8,016,404 | B2 | 9/2011 | Kato et al. |
| 2002/0096085 | A1 | 7/2002 | Gotoh et al. |

(Continued)

FOREIGN PATENT DOCUMENTS

| JP | H08-3498 A | 1/1996 |
| JP | 2000-513396 A | 10/2000 |

(Continued)

OTHER PUBLICATIONS

Jun. 28, 2016—(EP) Extended Search Report—App 15187202.5.

*Primary Examiner* — Veronica F Faison
(74) *Attorney, Agent, or Firm* — Banner & Witcoff, Ltd.

(57) ABSTRACT

A water-based ink for ink-jet recording includes: a pigment; water; a nonionic surfactant having an ethylene oxide chain; an anionic surfactant having an ethylene oxide chain; and a penetrant having an ethylene oxide chain, wherein the nonionic surfactant, the anionic surfactant, and the penetrant satisfy the following conditions (I) to (III).

$-1 \leq X-Y \leq 1$   condition (I):

$-1 \leq Y-Z \leq 1$   condition (II):

$-1 \leq Z-X \leq 1$   condition (III):

X: an average value of the number of ethylene oxide groups in the ethylene oxide chain of the nonionic surfactant Y: an average value of the number of ethylene oxide groups in the ethylene oxide chain of the anionic surfactant (Continued)

Z: an average value of the number of ethylene oxide groups in the ethylene oxide chain of the penetrant.

17 Claims, 1 Drawing Sheet

(56) References Cited

U.S. PATENT DOCUMENTS

| | | |
|---|---|---|
| 2006/0197814 A1* | 9/2006 | Doi .................. C09D 11/30 347/100 |
| 2006/0201380 A1 | 9/2006 | Kowalski et al. |
| 2007/0100023 A1 | 5/2007 | Burns et al. |
| 2007/0100024 A1 | 5/2007 | Gu et al. |
| 2008/0241398 A1 | 10/2008 | Kato et al. |
| 2009/0229489 A1 | 9/2009 | Gu |
| 2010/0077937 A1 | 4/2010 | Kawai et al. |
| 2011/0048278 A1* | 3/2011 | Kiyomoto ............ C09D 11/322 106/31.86 |

FOREIGN PATENT DOCUMENTS

| | | |
|---|---|---|
| JP | 2003-055590 A | 2/2003 |
| JP | 2004-231711 A | 8/2004 |
| JP | 2008-524400 A | 7/2008 |
| JP | 2008-246821 A | 10/2008 |
| JP | 2009-515007 A | 4/2009 |
| JP | 2011-515535 A | 5/2011 |

* cited by examiner

WATER-BASED INK FOR INK-JET RECORDING, INK CARTRIDGE, AND INK-JET RECORDING METHOD

CROSS REFERENCE TO RELATED APPLICATION

The present application claims priority from Japanese Patent Application No. 2015-073803, filed on Mar. 31, 2015, the disclosure of which is incorporated herein by reference in its entirety.

BACKGROUND OF THE INVENTION

Field of the Invention

The present invention relates to a water-based ink for ink-jet recording, an ink cartridge, and an ink-jet recording method.

Description of the Related Art

The water-based pigment ink containing a pigment and water has been suggested as the ink used for ink-jet recording (Japanese Patent Application Laid-open No. 2004-231711).

When the water-based pigment ink is made to have high optical density (OD value), strike-through occurs in some cases. The strike-through refers to, for example, the condition as follows. Namely, when a recorded matter is seen from the back surface (surface on the opposite side of the recorded surface), a recorded part with the water-based ink can be seen through the back surface. In view of the above, an object of the present teaching is to provide a water-based pigment ink for ink-jet recording which has high optical density (OD value) while preventing the strike-through.

SUMMARY OF THE INVENTION

According to a first aspect of the present teaching, there is provided a water-based ink for ink-jet recording, including: a pigment; water; a nonionic surfactant having an ethylene oxide chain; an anionic surfactant having an ethylene oxide chain; and a penetrant having an ethylene oxide chain, wherein the nonionic surfactant, the anionic surfactant, and the penetrant satisfy the following conditions (I) to (III).

$-1 \leq X-Y \leq 1$   condition (I):

$-1 \leq Y-Z \leq 1$   condition (II):

$-1 \leq Z-X \leq 1$   condition (III):

X: an average value of the number of ethylene oxide groups in the ethylene oxide chain of the nonionic surfactant Y: an average value of the number of ethylene oxide groups in the ethylene oxide chain of the anionic surfactant Z: an average value of the number of ethylene oxide groups in the ethylene oxide chain of the penetrant According to a second aspect of the present teaching, there is provided an ink cartridge including the water-based ink for ink-jet recording as defined in the first aspect.

According to a third aspect of the present teaching, there is provided an ink-jet recording method, including: preparing a water-based ink for ink-jet recording which contains a pigment, water, a nonionic surfactant having an ethylene oxide chain, an anionic surfactant having an ethylene oxide chain and a penetrant having an ethylene oxide chain; and discharging the water-based ink on a recording medium in accordance with an ink-jet system, wherein the nonionic surfactant, the anionic surfactant, and the penetrant satisfy the following conditions (I) to (III).

$-1 \leq X-Y \leq 1$   condition (I):

$-1 \leq Y-Z \leq 1$   condition (II):

$-1 \leq Z-X \leq 1$   condition (III):

X: an average value of the number of ethylene oxide groups in the ethylene oxide chain of the nonionic surfactant Y: an average value of the number of ethylene oxide groups in the ethylene oxide chain of the anionic surfactant Z: an average value of the number of ethylene oxide groups in the ethylene oxide chain of the penetrant

DESCRIPTION OF THE PREFERRED EMBODIMENTS

Figure 1:
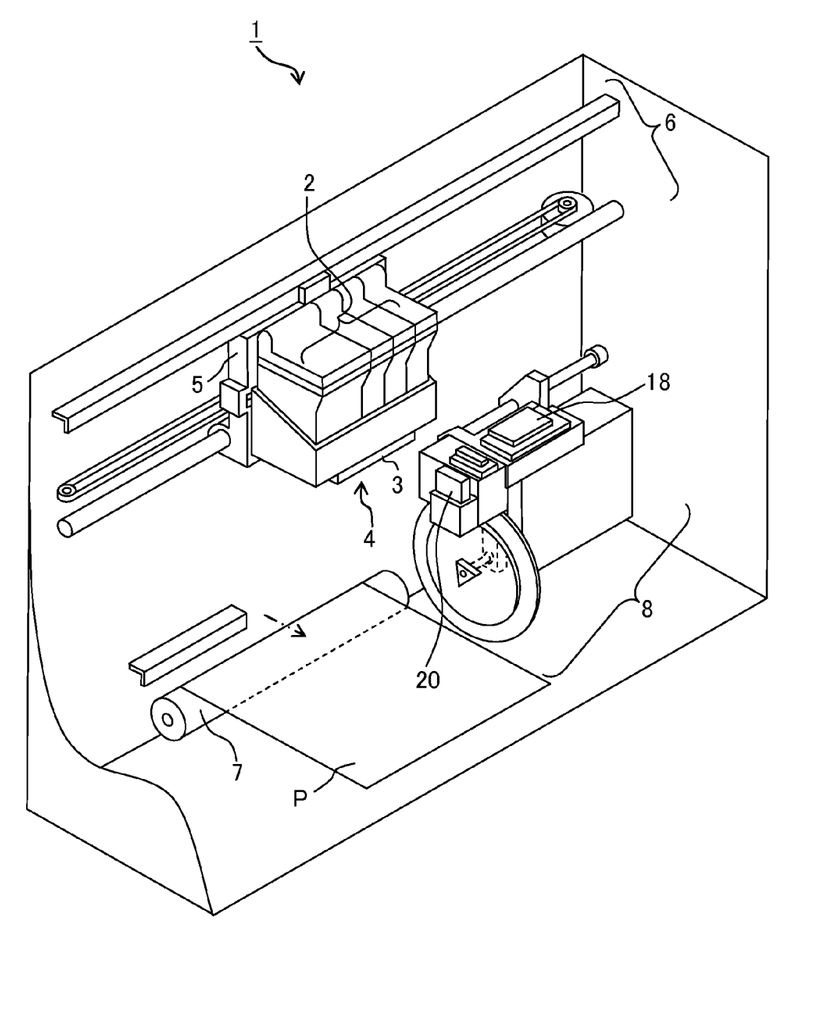
FIGURE is a schematic perspective view of an exemplary construction of an ink-jet recording apparatus of the present teaching.

An explanation will be given about a water-based ink for ink-jet recording of the present teaching (hereinafter referred to as "water-based ink" or "ink" in some cases). The water-based ink of the present teaching contains a pigment and water.

The pigment is not especially limited, and it is exemplified, for example, by carbon black, inorganic pigments, and organic pigments. The carbon black is exemplified, for example, by furnace black, lamp black, acetylene black, and channel black. The inorganic pigments are exemplified, for example, by titanium oxide, inorganic pigments based on iron oxide, and inorganic pigments based on carbon black. The organic pigments are exemplified, for example, by azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violet 19 and 196; C. I. Pigment Blues 1, 2, 3, 15, 15:1, 15:2, 15:3, 15:4, 16, 22, and 60; C. I. Pigment Greens 7 and 36; and solid solutions of the above pigments. The water-based ink of the present teaching may be a preparation obtained by dispersing the pigment in water using a dispersing agent. As the dispersing agent, for example, a general polymer dispersant may be used. Further, the pigment may be polymetrically encapsulated in the water-based ink of the present teaching.

The pigment may be any self-dispersible pigment. The self-dispersible pigment is dispersible in water without using any dispersant, for example, owing to the fact that at least one of hydrophilic group, such as carbonyl group, hydroxyl group, carboxylic acid group, sulfonic acid group, and phosphoric acid group, and the salt thereof is introduced directly or via any group into pigment particles by a chemical bond. Those usable as the self-dispersible pigment include, for example, those in which the pigment is treated or processed in accordance with any method described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. 2006/0201380, Published Japanese Translation of PCT International Publication for Patent Application No. 2009-515007 corresponding to United States Patent Application Publication Nos. 2007/0100023 and 2007/0100024, and Published Japanese Translation of PCT International Publication for Patent Application No. 2011-515535 corresponding to United States Patent Application Publication No. 2009/0229489. Either one of the inorganic pigment and the organic pigment may be used as a material for the self-dispersible pigment. The pigment which is suitable for the above treatment is exemplified, for example, by carbon black such as "MA8", "MA100", and "#2650" produced by Mitsubishi Chemical Corporation. Any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd. The self-dispersible pigment is preferably used as the pigment, and the self-dispersible pigment modified by carboxyl group is more preferably used.

The solid content blending amount (pigment solid content) of the pigment in the entire amount of the water-based ink is not particularly limited, and may be appropriately determined based on desired optical density, color (hue, tint), or the like. The pigment solid content is, for example, in a range of 0.1% by weight to 20% by weight, preferably in a range of 3% by weight to 10% by weight, more preferably in a range of 6% by weight to 10% by weight, and further preferably in a range of 7% by weight to 10% by weight. Although the strike-through is more likely to occur as the pigment solid content is higher, the present teaching can prevent the strike-through regardless of the pigment solid content.

The average particle size of the pigment is, for example, in a range of 50 nm to 200 nm, and preferably in a range of 140 nm to 160 nm. The pigment having a relatively large average particle size of 140 nm to 160 nm is less likely to penetrate a recording sheet in a vertical direction (thickness direction of the recording sheet), and thus the pigment is more likely to remain on the recording sheet. Thus, by making the average particle size in a range of 140 nm to 160 nm, the water-based ink having higher optical density (OD value) can be obtained. The average particle size can be calculated as follows. For example, the pigment is diluted to have the pigment solid content of 0.02% by weight, and scattered light intensity is calculated as the reference of particle size by using a dynamic light scattering particle size analyzer "LB-550" manufactured by HORIBA, Ltd.

In addition to the pigment, the water-based ink may further contain any other colorant such as dye, or the water-based ink may not contain any other colorant.

It is preferred that the water be ion-exchanged water or pure water (purified water). The blending amount of water in the entire amount of the water-based ink may be, for example, the balance of the other components.

The water-based ink further contains a nonionic surfactant (hereinafter referred to as "EO chain-containing nonionic surfactant" in some cases) having ethylene oxide chain(s) (hereinafter referred to as "EO chain(s)" in some cases); an anionic surfactant having EO chain(s) (hereinafter referred to as "EO chain-containing anionic surfactant"), and a penetrant having EO chain(s) (hereinafter referred to as "EO chain-containing penetrant").

The EO chain-containing nonionic surfactant may be any nonionic surfactant, provided that the nonionic surfactant contains EO chain(s). The EO chain-containing nonionic surfactant includes, for example, 1 to 6 EO chain(s), preferably 1 to 3 EO chain(s), and more preferably 1 to 2 EO chain(s) per one molecule. The average value (X) of the number of ethylene oxide groups (hereinafter referred to as "EO group(s)" in some cases) contained in the EO chain(s) is, for example, 1 to 20, preferably 2 to 10, and more preferably 2 to 5. The EO chain-containing nonionic surfactant is exemplified, for example, by an acetylene glycol EO adduct, polyoxyethylene alkyl ether, polyoxyethylene sorbitan fatty acid ester, polyoxyethylene arylether, polyoxyethylene alkylamine ether, and polyoxyethylene polyoxypropylene block polymer. Any commercially available product may be used for the EO chain-containing nonionic surfactant. The commercially available product includes "OLFIN (trade name) E1004" (acethylene glycol EO adduct, X=2), "OLFIN (trade name) E1008" (acethylene glycol EO adduct, X=4), and "OLFIN (trade name) E1010" (acetylene glycol EO adduct, X=5) produced by Nissin Chemical Co., Ltd; "EMULGEN (trade name) 103" (polyoxyethylene laurylether, X=3) and "EMULGEN (trade name) 106" (polyoxyethylene laurylether, X=5) produced by KAO CORPORATION; and the like.

It is preferred that the EO chain-containing nonionic surfactant be an acetylene glycol-based nonionic surfactant represented by the formula (1). The acetylene glycol-based nonionic surfactant represented by the formula (1) is especially likely to spread on a recording sheet in a lateral direction (the direction along a recording surface of the recording sheet) as compared with other nonionic surfactants. Thus, using the acetylene glycol-based nonionic surfactant represented by the formula (1) results in the water-based ink having a better quick-drying property and higher optical density (OD value).

(1)

In the formula (1), m and n may be same or different from each other, and m and n are integers satisfying m+n=1 to 15, preferably integers satisfying m+n=3 to 11, and more preferably integers satisfying m+n=4 to 10. In the formula (1), each of $R^1$, $R^2$, $R^3$, and $R^4$ is a straight or branched chain alkyl group having 1 to 5 carbon atoms, and $R^1$, $R^2$, $R^3$, and $R^4$ may be same or different from one another. $R^1$, $R^2$, $R^3$ and $R^4$ are exemplified, for example, by methyl group, ethyl group, propyl group, isopropyl group, butyl group and isobutyl group. Each of $R^1$, $R^2$, $R^3$ and $R^4$ is preferably methyl group or isopropyl group.

Among the commercially available products of the EO chain-containing nonionic surfactant, the acetylene glycol-based nonionic surfactant is exemplified, for example, by "OLFIN (trade name) E1004" (acetylene glycol EO adduct, X (m or n)=2, m+n=4), "OLFIN (trade name) E1008" (acetylene glycol EO adduct, X (m or n)=4, m+n=8), and "OLFIN (trade name) E1010" (acetylene glycol EO adduct, X (m or n)=5, m+n=10) produced by Nissin Chemical Co., Ltd.

The acetylene glycol-based nonionic surfactant of which X is small is especially likely to spread on the recording sheet in the lateral direction. Thus, in terms of improving the optical density (OD value), X is preferably 2 to 5, and more preferably 2. As described above, the pigment having a large average particle size of 140 nm to 160 nm is less likely to penetrate the recording sheet in the vertical direction (thickness direction of the recording sheet), and thus the pigment is more likely to remain on the recording sheet. Further, the pigment having a large average particle size is less likely to spread on the recording sheet also in the lateral direction. The acetylene glycol-based nonionic surfactant, in which X is 2 to 5 and is preferably 2, has the effect to spread the water-based ink using the pigment having a large average particle size on the recording sheet in the lateral direction. Thus, by using the pigment having a large average particle size of 140 nm to 160 nm in combination with the acetylene glycol-based nonionic surfactant, in which X is 2 to 5 and is preferably 2, the water-based ink having a better quick-drying property and higher optical density (OD value) can be obtained.

In terms of improving the quick-drying property and optical density (OD value), it is preferred that the EO chain-containing nonionic surfactant contain only the EO chain as the hydrophilic group. That is, it is preferred that the EO chain-containing nonionic surfactant contain no alkylene oxide chain, which contains an alkylene oxide group rather than the EO group.

The weight average molecular weight of the EO chain-containing nonionic surfactant is not especially limited, and it is preferably 300 or more.

The blending amount of the EO chain-containing nonionic surfactant in the entire amount of the water-based ink is, for example, in a range of 0.05% by weight to 2% by weight, preferably in a range of 0.1% by weight to 1.5% by weight, and more preferably in a range of 0.3% by weight to 1% by weight. By making the blending amount of the EO chain-containing nonionic surfactant, which is more likely to spread on the recording sheet in the lateral direction, 0.3% by weight or more, the water-based ink having higher optical density (OD value) can be obtained. Noted that the nonionic surfactant is less likely to dissolve in water in some cases, and thus the water-based ink having a large amount of nonionic surfactant might have poor storage stability. In view of this, by making the blending amount of the EO chain-containing nonionic surfactant 1% by weight or less, the water-based ink having better storage stability can be obtained.

In the water-based ink, the weight ratio (N/Pig) of the blending amount (N) of the acetylene glycol-based nonionic surfactant represented by the formula (1) to the blending amount (Pig) of the pigment is, for example, 0.5/100 to 100/100, preferably 1/100 to 35/100, and more preferably 3.5/100 to 17/100. Making the weight ratio (N/Pig) within the above ranges can further improve the optical density (OD value) of the water-based ink.

As described above, the nonionic surfactant is less likely to dissolve in water in some cases. The EO chain-containing anionic surfactant has the function to help the solution or dissolution of the EO chain-containing nonionic surfactant in water. The EO chain-containing anionic surfactant may be any anionic surfactant, provided that the anionic surfactant contains EO chain(s). The EO chain-containing anionic surfactant includes, for example, 1 to 6 EO chain(s), preferably 1 to 3 EO chain(s), and more preferably 1 EO chain, per one molecule. The average value (Y) of the number of EO groups in the EO chain(s) is, for example, 1 to 50, preferably 1 to 20, more preferably 2 to 10, and further preferably 3 to 5. The EO chain-containing anionic surfactant may include a straight or branched chain alkyl group having 10 to 14 carbon atoms. The EO chain-containing anionic surfactant is exemplified, for example, by a carboxylic acid type having carboxylic acid salt, a sulfuric acid ester type having a sulfuric acid ester structure, and a phosphoric acid ester type having a phosphoric acid ester structure. The carboxylic acid type having ether carboxylic acid salt is preferably used. The sulfuric acid ester type having ether sulfuric acid ester salt is preferably used. Any commercially available product may be used for the EO chain-containing anionic surfactant. The commercially available product, which contains the ether carboxylic acid salt, includes, for example, "KAO AKYPO RLM-45NV" (Sodium polyoxyethylene lauryl ether acetate, Y=5), "KAO AKYPO RLM-100NV" (Sodium polyoxyethylene(10) lauryl ether acetate, Y=10), "ENAGICOL (trade name) EC-30" (Sodium polyoxyethylene lauryl ether acetate, Y=3), and "NIKKOL AKYPO RLM 100 NV" (Aqueous solution of sodium polyoxyethylene(10) lauryl ether acetate, Y=10) produced by KAO CORPORATION. The commercially available product, which contains the ether sulfuric acid ester salt, includes, for example, "EMAL (trade name) 20C" (Sodium polyoxyethylene(3) lauryl ether sulfate, Y=3), "EMAL (trade name) E-27C" (Sodium polyoxyethylene lauryl ether sulfate, Y=2), and "LATEMUL-E150" (Sodium polyoxyethylene lauryl ether sulfate, Y=50) produced by KAO CORPORATION; "SUNNOL (trade name) NL1430" (Sodium polyoxyethylene alkyl ether sulfate, Y=3) produced by Lion Corporation; and "SANDET (trade name) ET" (Polyoxyethylene lauryl ether sulfuric acid ester, Y=4) produced by Sanyo Chemical Industries, Ltd. The phosphoric acid ester type is exemplified, for example, by polyoxyethylene-alkyl ether-phosphoric acid salt and polyoxyethylene-alkylphenyl ether-phosphoric acid salt.

In terms of improving the dissolubility of the EO chain-containing nonionic surfactant in water, it is preferred that the EO chain-containing anionic surfactant contain no alkylene oxide chain, which contains an alkylene oxide group rather than the EO group.

The blending amount of the EO chain-containing anionic surfactant in the entire amount of the water-based ink is, for example, in a range of 0.02% by weight to 2% by weight, preferably in a range of 0.05% by weight to 1.5% by weight, and more preferably in a range of 0.1% by weight to 1% by weight.

The EO chain-containing penetrant has the function to adjust the drying speed on a recording sheet. The EO chain-containing penetrant includes, for example, 1 to 6 EO chain(s), preferably 1 to 3 EO chain(s), and more preferably 1 EO chain per one molecule. The average value (Z) of the number of EO groups in the EO chain(s) is, for example, 1 to 20, preferably 1 to 10, and more preferably 3 to 5. The EO chain-containing penetrant is exemplified, for example, by glycol ether. Examples of the glycol ether include ethylene glycol methyl ether (Z=1), ethylene glycol ethyl ether (Z=1), ethylene glycol n-propyl ether (Z=1), diethylene glycol methyl ether (Z=2), diethylene glycol ethyl ether (Z=2), diethylene glycol n-propyl ether (Z=2), diethylene glycol n-butyl ether (Z=2), diethylene glycol n-hexyl ether (Z=2), triethylene glycol methyl ether (Z=3), triethylene glycol ethyl ether (Z=3), triethylene glycol n-propyl ether (Z=3), triethylene glycol n-butyl ether (Z=3), and "HIGH SOLVE MPM" (polyethylene glycol dimethyl ether, Z=5) produced by TOHO CHEMICAL INDUSTRY CO., LTD.

The weight average molecular weight of the EO chain-containing penetrant is not especially limited. The weight average molecular weight of the EO chain-containing penetrant is preferably 300 or less, and more preferably 250 or less.

The EO chain-containing penetrant preferably contains an alkyl group having 3 or more carbon atoms. This results in the water-based ink having a better quick-drying property. The EO chain-containing penetrant particularly preferably contains an alkyl group (butyl group) having 4 carbon atoms.

It is preferred that the EO chain-containing penetrant be ethylene glycol ether represented by the formula (2).

$$R^5O(CH_2CH_2O)_{n1}R^6 \qquad (2)$$

In the formula (2), n1 is 1 to 10, and preferably 3 to 5. In the formula (2), $R^5$ and $R^6$ may be same or different from each other. $R^5$ is a straight or branched chain alkyl group having 1 to 4 carbon atoms, and $R^6$ is hydrogen or a straight or branched chain alkyl group having 1 to 4 carbon atoms. It is preferred that $R^5$ or $R^6$ be a straight chain alkyl group (n-butyl group) having 4 carbon atoms.

The blending amount of the EO chain-containing penetrant in the entire amount of the water-based ink is, for example, in a range of 0.5% by weight to 10% by weight, preferably in a range of 1% by weight to 5% by weight, and more preferably in a range of 2% by weight to 4% by weight. By making the blending amount of the EO chain-containing penetrant, which is more likely to spread on the recording sheet in the vertical direction, 4% by weight or less, the water-based ink which hardly causes the strike-through can be obtained. By making the blending amount of the EO chain-containing penetrant 2% by weight or more, it is possible to obtain the water-based ink having higher optical density (OD value) and a better quick-drying property.

In the water-based ink, the EO chain-containing nonionic surfactant, EO chain-containing anionic surfactant, and EO chain-containing penetrant are blended or mixed to meet the following conditions: condition (I): $-1 \leq X-Y \leq 1$, condition (II): $-1 \leq Y-Z \leq 1$, and the condition (III): $-1 \leq Z-X \leq 1$. This allows the water-based ink to have high optical density (OD value) while preventing the strike-through. Although the details of mechanism for obtaining the above effects are not clear, but it can be assumed as follows. That is, since the EO chain-containing nonionic surfactant, EO chain-containing anionic surfactant, and EO chain-containing penetrant have similar average values of the number of EO groups in the EO chains, the EO chain-containing nonionic surfactant, EO chain-containing anionic surfactant, and EO chain-containing penetrant have similar characteristics, and thereby making it possible to exhibit their properties easily. This mechanism, however, is merely a presumption, and the present teaching is not limited to and restricted by this presumed mechanism. Regarding "X" in the conditions (I) to (III), when the EO chain-containing nonionic surfactant contains only one EO chain, the average value of the number of EO groups in the EO chain(s) of the EO chain-containing nonionic surfactant is equal to the number of EO groups in the one EO chain. When the EO chain-containing nonionic surfactant contains EO chains, the average value of the number of EO groups in the EO chain(s) of the EO chain-containing nonionic surfactant is the average value of the number of EO groups in the EO chains. The same relation is true for the average value of the number of EO groups in the EO chain(s) of the EO chain-containing anionic surfactant (i.e., "Y" in the conditions (I) to (III)) and the average value of the number of EO groups in the EO chain(s) of the EO chain-containing penetrant (i.e., "Z" in the conditions (I) to (III)). When the number of EO groups in the EO chain(s) has distribution, the number of EO groups is a peak value in the distribution.

As the combinations of "X-Y", "Y-Z", and "Z-X" in the conditions (I) to (III), there are 27 combinations as follows: (X-Y, Y-Z, Z-X)=(-1, -1, -1), (-1, -1, 0), (-1, -1, 1), (-1, 0, -1), (-1, 0, 0), (-1, 0, 1), (-1, 1, -1), (-1, 1, 0), (-1, 1, 1), (0, -1, -1), (0, -1, 0), (0, -1, 1), (0, 0, -1), (0, 0, 0), (0, 0, 1), (0, 1, -1), (0, 1, 0), (0, 1, 1), (1, -1, -1), (1, -1, 0), (1, -1, 1), (1, 0, -1), (1, 0, 0), (1, 0, 1), (1, 1, -1), (1, 1, 0), and (1, 1, 1).

When the blending amount of the EO chain-containing nonionic surfactant in the entire amount of the water-based ink is 100 parts by weight, the blending amount of the EO chain-containing anionic surfactant in the entire amount of the water-based ink is, for example, in a range of 5 parts by weight to 400 parts by weight, preferably in a range of 10 parts by weight to 200 parts by weight, more preferably in a range of 20 parts by weight to 100 parts by weight. Namely, the weight ratio (A/N) of the blending amount (A) of the EO chain-containing anionic surfactant to the blending amount (N) of the EO chain-containing nonionic surfactant is, for example, 5/100 to 400/100, preferably 10/100 to 200/100, more preferably 20/100 to 100/100.

When the blending amount of the EO chain-containing nonionic surfactant in the entire amount of the water-based ink is 100 parts by weight, the blending amount of the EO chain-containing penetrant in the entire amount of the water-based ink is, for example, in a range of 50 parts by weight to 20,000 parts by weight, preferably in a range of 100 parts by weight to 10,000 parts by weight, more preferably in a range of 200 parts by weight to 2000 parts by weight. Namely, the weight ratio (P/N) of the blending amount (P) of the EO chain-containing penetrant to the blending amount (N) of the EO chain-containing nonionic surfactant is, for example, 50/100 to 20000/100, preferably 100/100 to 10000/100, more preferably 200/100 to 2000/100.

In the water-based ink, both of the EO chain-containing nonionic surfactant and the EO chain-containing penetrant may be ethylene glycol ether represented by the formula (2). When $R^5$ and/or $R^6$ is/are long alkyl group(s) (alkyl group(s) having many carbon atoms) in the formula (2), the ethylene glycol ether represented by the formula (2) must have high surface-active performance and function as a surfactant; and when $R^5$ and/or $R^6$ is/are short alkyl group(s) (alkyl group(s) having few carbon atoms) in the formula (2), the ethylene glycol ether represented by the formula (2) must have high permeability and function as a penetrant.

$$R^5O(CH_2CH_2O)_{n1}R^6 \qquad (2)$$

In this case, the EO chain-containing nonionic surfactant may be represented by the formula (2), in which n1 is 3 to 5; $R^5$ and $R^6$ may be same or different from each other; $R^5$ is a straight or branched chain alkyl group having 1 to 20 carbon atoms; and $R^6$ is hydrogen or a straight or branched chain alkyl group having 1 to 20 carbon atoms. Further, the EO chain-containing penetrant may be represented by the formula (2), in which n1 is 3 to 5; $R^5$ and $R^6$ may be same or different from each other; $R^5$ is a straight or branched chain alkyl group having 1 to 4 carbon atoms; and $R^6$ is hydrogen or a straight or branched chain alkyl group having 1 to 4 carbon atoms.

In order to have high optical density (OD value) while preventing the strike-through, only the EO chain-containing nonionic surfactant and EO chain-containing anionic surfactant may be used as surfactants of the water-based ink, and only the EO chain-containing penetrant may be used as the penetrant of the water-based ink. In other words, the water-based ink may not contain any surfactant with no EO chain and any penetrant with no EO chain.

The water-based ink may further contain a humectant. The humectant has the function, for example, to prevent the water-based ink from drying at a nozzle tip portion of an ink-jet head. The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectants are used in combination. Among the above-described humectants, it is preferable to use polyvalent alcohols such as alkylene glycol, glycerol, etc.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

When the water-based ink contains glycerol, the blending amount of glycerol in the entire amount of the water-based ink is, for example, in a range of 2% by weight to 50% by weight, preferably in a range of 5% by weight to 40% by weight, and more preferably in a range of 10% by weight to 30% by weight. In the water-based ink, the weight ratio (G/Pig) of the blending amount (G) of glycerol to the blending amount (Pig) of the pigment is, for example, 0.5 to 25, preferably 1 to 10, and more preferably 2.5 to 3.4. Making the weight ratio (G/Pig) within the above ranges can efficiently prevent the water-based ink at a nozzle tip portion of the ink-jet head from drying.

The water-based ink may further contain a conventionally known additive, as necessary. The additive is exemplified, for example, by pH-adjusting agents, viscosity-adjusting agents, surface tension-adjusting agents, and fungicides. The viscosity-adjusting agents are exemplified, for example, by polyvinyl alcohol, cellulose, and water-soluble resin.

The water-based ink can be prepared, for example, such that the pigment, water, the EO chain-containing nonionic surfactant, the EO chain-containing anionic surfactant, the EO chain-containing penetrant, and optionally other additive component(s) are mixed uniformly in accordance with any conventionally known method, and undissolved matters are removed by a filter or the like.

As described above, the water-based ink of the present teaching can have high optical density (OD value) while preventing the strike-through by containing the nonionic surfactant, anionic surfactant, and penetrant, those of in which the absolute value of the difference between average values of the number of ethylene oxide groups (EO groups) in the ethylene oxide chain(s) (EO chain(s)) is one or less.

It is possible to produce an ink cartridge by accommodating the water-based ink of the present teaching in an ink case. It is allowable to use any known ink case (body for ink cartridge) as the ink case (body) of the ink cartridge.

Next, an ink-jet recording apparatus and an ink-jet recording method of the present teaching will be explained.

The ink-jet recording apparatus of the present teaching is an ink-jet recording apparatus including an ink-accommodating section and an ink discharge mechanism, wherein an ink accommodated in the ink accommodating section is discharged by the ink discharge mechanism. The water-based ink for ink-jet recording of the present teaching is accommodated in the ink accommodating section.

The ink-jet recording method of the present teaching is an ink-jet recording method for performing recording by discharging the water-based ink for ink-jet recording of the present teaching on a recording sheet in accordance with the ink-jet system. The strike-through is more likely to occur when regular paper, in particular, thin regular paper, is used as the recording sheet. In the present teaching, however, the strike-through can be prevented, even when thin regular paper, for example, regular paper having a thickness in a range of 70 to 130 μm is used as the recording sheet. The "regular paper (plain paper sheet)" herein means a recording sheet of which recording surface has paper fibers exposed thereon without any coating layer.

The ink-jet recording method of the present teaching can be practiced by, for example, using the above ink-jet recording apparatus. The recording includes printing text (character, letter), printing image or picture, printing, etc.

FIGURE depicts the configuration of an example of the ink-jet recording apparatus of the present teaching. As depicted in FIGURE, an ink-jet recording apparatus 1 includes four ink cartridges 2, an ink discharge mechanism (ink-jet head) 3, a head unit 4, a carriage 5, a driving unit 6, a platen roller 7, and a purge device 8 as main constitutive components or parts. It is preferred that the ink-jet discharge mechanism (ink-jet head) 3 be a piezo ink-jet head. When the water-based ink in which the blending amount (pigment solid content) of the pigment is high (e.g. the water-based ink in which the blending amount of the pigment is, for example, in a range of 6% by weight to 10% by weight, preferably in a range of 7% by weight to 10% by weight) is used, a thermal ink-jet head could cause burning and sticking etc., at the time of jetting of such a water-based ink. The piezo ink-jet head, however, can discharge such a water-based ink stably.

The four ink cartridges 2 contain four colors of water-based inks respectively, the four colors being yellow, magenta, cyan, and black. At least one of four colors of water-based inks is the water-based ink for ink-jet recording of the present teaching. The ink-jet head 3 disposed on the head unit 4 performs recording on a recording medium P (for example, a recording paper or recording paper sheet P). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, United States Patent Application Publication No. US 2008/0241398 A1 corresponding to Japanese Patent Application Laid-open No. 2008-246821). The platen roller 7 extends in the reciprocating direction of the carriage 5 and is arranged to face or be opposite to the ink-jet head 3.

The purge device 8 sucks any unsatisfactory ink which contains air bubbles, etc. accumulated in the ink-jet head 3. As the purge device 8, it is possible to use, for example, a conventionally known purge device (see, for example, United States Patent Application Publication No. US 2008/0241398 A1 corresponding to Japanese Patent Application Laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIGURE, a cap 18 is provided to cover nozzles of the ink-jet head 3 which is returned to a reset position upon completion of the recording, so as to prevent the water-based ink from drying.

In the ink-jet recording apparatus 1 of this example, the four ink cartridges 2 are provided, together with the head unit 4, on one carriage 5. Note that, however, the present teaching is not limited to this. In the ink-jet recording apparatus 1, each of the four ink cartridges 2 may be provided on another carriage which is different from that for the head unit 4. Alternatively, each of the four ink cartridges 2 may be arranged and fixed inside the ink-jet recording apparatus 1, rather than being provided on the carriage 5. In such an aspect, for example, each of the four ink cartridges 2 and the head unit 4 which is provided on the carriage 5 are connected with a tube, etc., and each of the water-based inks is supplied from one of the four ink cartridges 2 to the head unit 4 via the tube.

An ink-jet recording using the ink-jet recording apparatus 1 is performed, for example, in the following manner. At first, a recording paper P is supplied or fed from a paper feeding cassette (not depicted in the drawings) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based inks discharged from the ink-jet head 3. The recording paper P after the recording is discharged from the ink-jet recording apparatus 1. According to the present teaching, it is possible to obtain a recorded matter in which optical density (OD value) is high and the strike-through is prevented. In FIGURE, the feed mechanism and discharge mechanism for the recording paper P are omitted.

Although the apparatus depicted in FIGURE adopts an ink-jet head of the serial type, the present teaching is not limited to this. The ink-jet recording apparatus may be an apparatus adopting an ink-jet head of the line type.

EXAMPLES

Next, examples of the present teaching will be explained together with comparative examples. Note that the present teaching is not limited and is not restricted to the examples and the comparative examples which will be described below.

<Preparation of Self-Dispersible Pigment Water-Dispersion Liquid A>

40 g of carbon black ("#2650" produced by Mitsubishi Chemical Corporation) was mixed with 200 g of ion-exchanged water, and the mixture was ground or pulverized by use of a bead mill. A carboxylating agent was added to the crushed mixture. The mixture, to which the carboxylating agent was added, was heated and stirred, and then oxidatively-treated. Next, the solution (liquid) obtained as described above was washed or cleaned with a solvent several times, after that, the solution was poured into water. After washed with water several times, the solution was filtrated or filtered through a filter, thereby obtaining a self-dispersible pigment water-dispersion liquid A. The average particle size of the self-dispersible pigment of self-dispersible pigment water-dispersion liquid A was 156 nm. The average particle size was measured by using a dynamic light scattering particle size analyzer "LB-550" manufactured by HORIBA, Ltd.

Examples 1 to 11 and Comparative Examples 1 to 5

Each of the water-based inks for ink-jet recording of Examples 1 to 11 and Comparative Examples 1 to 5 was obtained as follows. That is, respective components of Composition of Water-based Ink indicated in TABLE 1 except for the self-dispersible pigment water-dispersion liquid A or the self-dispersible pigment were mixed uniformly, thereby obtaining an ink solvent. Subsequently, the ink solvent was added to the self-dispersible pigment dispersed in the self-dispersible pigment water-dispersion liquid A or water, followed by being mixed uniformly. After that, the obtained mixture was filtrated by using a cellulose acetate membrane filter (pore size: 3.00 μm) produced by Toyo Roshi Kaisha, Ltd. CAB-O-JET (trade name) 300 in TABLE 1 is self-dispersible carbon black dispersion modified by a carboxyl group.

With respect to the water-based inks of Examples 1-11 and Comparative Examples 1-5, (a) optical density (OD value) evaluation, (b) strike-through evaluation, (c) evaluation for quick-drying property, and (d) overall evaluation were performed according to the following methods. The samples used for the above evaluations were prepared as follows.

<Preparation of Evaluation Samples>

An ink-jet recording apparatus MFC-J6970CDW manufactured by BROTHER KOGYO KABUSHIKI KAISHA was used to record an image including a single-color patch by using each of the water-based inks of Examples 1-11 and Comparative Examples 1-5 on a plain paper sheet (regular paper) ("4200" produced by XEROX CORPORATION) under the following conditions: a resolution of 600 dpi×300 dpi; Duty 100%; an amount of one liquid droplet of the ink of 35 pL, thereby preparing each evaluation sample.

(a) Optical Density (OD Value) Evaluation

Optical densities (OD values) were measured at three positions in each evaluation sample by using a spectrophotometer (spectrophotometric colorimetry meter) "SpectroEye" (light source: $D_{50}$, field: 2°, density: ANSI T) manufactured by X-RITE INC., to obtain an average value. Then, the optical density (OD value) evaluation was performed in accordance with the following evaluation criterion.

<Optical Density (OD Value) Evaluation and Evaluation Criterion>

AA: The optical density (OD value) was 1.40 or more.

A: The optical density (OD value) was 1.35 or more and less than 1.40.

B: The optical density (OD value) was 1.30 or more and less than 1.35.

C: The optical density (OD value) was less than 1.30.

(b) Strike-Through Evaluation

Optical densities (OD values) were measured at the back side of a solid recording portion and a portion where no recording is performed in each evaluation sample by using the spectrophotometer "SpectroEye" (light source: $D_{50}$, field: 2°, density: ANSI T). Then, the strike-through evaluation was performed in accordance with the following evaluation criterion.

<Strike-Through Evaluation and Evaluation Criterion>

A: The difference between the optical density (OD value) of the back side of the solid recording portion and the optical density (OD value) of the portion where no recording is performed was not more than 0.08.

C: The difference between the optical density (OD value) of the back side of the solid recording portion and the optical density (OD value) of the portion where no recording is performed exceeded 0.08.

(c) Evaluation for Quick-Drying Property

The recording portion of each evaluation sample was rubbed by a cotton swab at 5-second intervals after the recording, and the quick-drying property evaluation was performed in accordance with the following evaluation criterion.

<Evaluation for Quick-Drying Property and Evaluation Criterion>

AA: The rubbing off of the water-based ink did not occur after the elapse of 5 seconds from the recording.

A: Although the rubbing off of the water-based ink occurred after the elapse of 5 seconds from the recording, the rubbing off did not occur after the elapse of 10 seconds from the recording.

B: The rubbing off of the water-based ink still occurred after the elapse of 10 seconds from the recording.

(d) Overall Evaluation

The overall evaluation was performed on each of the water-based inks of Examples 1-11 and Comparative Examples 1-5 based on the results of evaluations (a) to (c) in accordance with the following criterion.

<Overall Evaluation and Evaluation Criterion>

G: All of the results of (a) to (c) were AA, A, or B.

NG: Any one of the results (a) to (c) was C.

The compositions of the water-based inks of Examples 1 to 11 and Comparative Examples 1 to 5 and the results of the evaluations are indicated in TABLE 1 as follows.

Table 1 (Following)—Legend

1: Self-dispersible pigment, produced by Cabot Corporation, average particle size: 125 nm, numerical values in TABLE 1 indicate the sold content amount.

2: Average particle size: 156 nm, numerical values in TABLE 1 indicate the sold content amount.

3: Acetylene glycol-based nonionic surfactant, produced by Nissin Chemical Co., Ltd.; active ingredient amount=100% by weight.

4: Acetylene glycol-based nonionic surfactant, produced by Nissin Chemical Co., Ltd.; active ingredient amount=100% by weight.

5: Acetylene glycol-based nonionic surfactant, produced by Nissin Chemical Co., Ltd.; active ingredient amount=100% by weight.

6: Polyoxyethylene laurylether, produced by KAO CORPORATION; active ingredient amount=100% by weight.

7: Polyoxyethylene laurylether, produced by KAO CORPORATION; active ingredient amount=100% by weight.

8: Sodium polyoxyethylene lauryl ether sulfate, produced by KAO CORPORATION; active ingredient amount=27% by weight.

9: Sodium polyoxyethylene alkyl (C=12, 13) ether sulfate, produced by Lion Corporation; active ingredient amount=28% by weight.

10: Sodium polyoxyethylene lauryl ether acetate, produced by KAO CORPORATION; active ingredient amount=24% by weight.

11: Polyethylene glycol dimethyl ether, produced by TOHO CHEMICAL INDUSTRY CO., LTD.; active ingredient amount=100% by weight.

TABLE 1

| | | | | EXAMPLES | | | | | | | |
|---|---|---|---|---|---|---|---|---|---|---|---|
| | | | | 1 | 2 | 3 | 4 | 5 | 6 | 7 | 8 |
| Water-based Ink Composition (% by weight) | Pigment | CAB-O-JET (trade name) 300 (*1) | | 8.00 | 6.00 | 6.00 | 8.00 | 6.00 | — | 8.00 | 8.00 |
| | | Self-dispersible pigment water-dispersion liquid A (*2) | | — | — | — | — | — | 8.00 | — | — |
| | EO chain-containing nonionic surfactant | Olfine (trade name) E1004 (*3) | X = 2 | 0.30 | 0.30 | — | — | 0.30 | 0.50 | — | — |
| | | Olfine (trade name) E1008 (*4) | X = 4 | — | — | — | — | — | — | 0.30 | 0.30 |
| | | Olfine (trade name) E1010 (*5) | X = 5 | — | — | — | — | — | — | — | — |
| | | Emulgen (trade name) 103 (*6) | X = 3 | — | — | 0.30 | 0.30 | — | — | — | — |
| | | Emulgen (trade name) 106 (*7) | X = 5 | — | — | — | — | — | — | — | — |
| | EO chain-containing anionic surfactant | Emal (trade name) E-27C (*8) | Y = 2 | — | — | — | — | — | — | — | — |
| | | Sunnol (trade name) NL1430 (*9) | Y = 3 | 0.20 | 0.20 | 0.20 | 0.20 | 0.20 | 0.20 | 0.20 | 0.20 |
| | | Kao Akypo RLM-45NV (*10) | Y = 5 | — | — | — | — | — | — | — | — |
| | EO chain-containing penetrant | Diethylene glycol n-butyl ether | Z = 2 | — | — | — | — | — | — | — | — |
| | | Triethylene glycol n-butyl ether | Z = 3 | 2.00 | 2.00 | 2.00 | — | — | 2.00 | — | 2.00 |
| | | Triethylene glycol methyl ether | Z = 3 | — | — | — | 2.00 | 2.00 | — | — | — |
| | | Tetraethylene glycol n-butyl ether | Z = 4 | — | — | — | — | — | — | 2.00 | — |
| | | HIGH SOLVE MPM (*11) | Z = 5 | — | — | — | — | — | — | — | — |

TABLE 1-continued

|  |  |  | | | | | | | | |
|---|---|---|---|---|---|---|---|---|---|---|
| | Humectant | Glycerol | 20.00 | 20.00 | 20.00 | 20.00 | 20.00 | 20.00 | 20.00 | 20.00 |
| | | Triethylene glycol | 3.00 | 3.00 | 3.00 | 3.00 | 3.00 | 3.00 | 3.00 | 3.00 |
| | Water | | balance | balance | balance | balance | balance | balance | balance | balance |
| Condition (I): X-Y | | | −1 | −1 | 0 | 0 | −1 | −1 | 1 | 1 |
| Condition (II): Y-Z | | | 0 | 0 | 0 | 0 | 0 | 0 | −1 | 0 |
| Condition (III): Z-X | | | 1 | 1 | 0 | 0 | 1 | 1 | 0 | −1 |
| Optical density (OD value) | | | 1.37 / A | 1.34 / B | 1.31 / B | 1.33 / B | 1.33 / B | 1.55 / AA | 1.31 / B | 1.34 / B |
| Strike-through | | | 0.08 / A | 0.08 / A | 0.08 / A | 0.05 / A | 0.08 / A | 0.08 / A | 0.08 / A | 0.07 / A |
| Optical density (OD value) − Strike-through | | | 1.29 | 1.26 | 1.23 | 1.28 | 1.25 | 1.47 | 1.23 | 1.27 |
| Quick-drying property | | | AA | AA | A | B | A | AA | AA | AA |
| Overall evaluation | | | G | G | G | G | G | G | G | G |

|  |  |  |  | EXAMPLES | | | COMPARATIVE EXAMPLES | | | | |
|---|---|---|---|---|---|---|---|---|---|---|---|
|  |  |  |  | 9 | 10 | 11 | 1 | 2 | 3 | 4 | 5 |
| Water-based Ink Composition (% by weight) | Pigment | CAB-O-JET (trade name) 300 (*1) | | 8.00 | 6.00 | 6.00 | 8.00 | 8.00 | 8.00 | 6.00 | 8.00 |
| | | Self-dispersible pigment water-dispersion liquid A (*2) | | — | — | — | — | — | — | — | — |
| | EO chain-containing nonionic surfactant | Olfine (trade name) E1004 (*3) | X = 2 | — | — | — | — | — | 0.30 | — | — |
| | | Olfine (trade name) E1008 (*4) | X = 4 | — | — | — | — | 0.30 | — | 0.30 | — |
| | | Olfine (trade name) E1010 (*5) | X = 5 | 1.00 | 1.00 | — | 1.00 | — | — | — | — |
| | | Emulgen (trade name) 103 (*6) | X = 3 | — | — | — | — | — | — | — | — |
| | | Emulgen (trade name) 106 (*7) | X = 5 | — | — | 1.00 | — | — | — | — | 0.50 |
| | EO chain-containing anionic surfactant | Emal (trade name) E-27C (*8) | Y = 2 | — | — | — | — | 0.20 | — | — | — |
| | | Sunnol (trade name) NL1430 (*9) | Y = 3 | — | — | — | 0.20 | — | — | 0.20 | 0.20 |
| | | Kao Akypo RLM-45NV (*10) | Y = 5 | 0.20 | 0.20 | 0.20 | — | — | 0.20 | — | — |
| | EO chain-containing penetrant | Diethylene glycol n-butyl ether | Z = 2 | — | — | — | — | — | — | 2.00 | — |
| | | Triethylene glycol n-butyl ether | Z = 3 | — | — | — | 2.00 | — | 2.00 | — | — |
| | | Triethylene glycol methyl ether | Z = 3 | — | — | — | — | — | — | — | — |
| | | Tetraethylene glycol n-butyl ether | Z = 4 | — | — | — | — | 2.00 | — | — | 2.00 |
| | | HIGH SOLVE MPM (*11) | Z = 5 | 2.00 | 2.00 | 2.00 | — | — | — | — | — |
| | Humectant | Glycerol | | 20.00 | 20.00 | 20.00 | 20.00 | 20.00 | 20.00 | 20.00 | 20.00 |
| | | Triethylene glycol | | 3.00 | 3.00 | 3.00 | 3.00 | 3.00 | 3.00 | 3.00 | 3.00 |
| | Water | | | balance | balance | balance | balance | balance | balance | balance | balance |
| Condition (I): X-Y | | | | 0 | 0 | 0 | 2 | 2 | −3 | 1 | 2 |
| Condition (II): Y-Z | | | | 0 | 0 | 0 | 0 | −2 | 2 | 1 | −1 |
| Condition (III): Z-X | | | | 0 | 0 | 0 | −2 | 0 | 1 | −2 | −1 |
| Optical density (OD value) | | | | 1.34 / B | 1.32 / B | 1.30 / B | 1.28 / C | 1.34 / B | 1.34 / B | 1.32 / B | 1.36 / A |
| Strike-through | | | | 0.08 / A | 0.08 / A | 0.07 / A | 0.11 / C | 0.10 / C | 0.09 / C | 0.09 / C | 0.09 / C |
| Optical density (OD value) − Strike-through | | | | 1.26 | 1.24 | 1.23 | 1.17 | 1.24 | 1.25 | 1.23 | 1.27 |
| Quick-drying property | | | | A | AA | B | A | AA | A | A | B |
| Overall evaluation | | | | G | G | G | NG | NG | NG | NG | NG |

As indicated in TABLE 1, regarding each of the water-based inks of Examples 1 to 11, the evaluation results of optical density (OD value) and strike-through were good. Regarding the water-based ink of Example 10 obtained by using the acetylene glycol-based nonionic surfactant as the EO chain-containing nonionic surfactant, the evaluation result of the quick-drying property was superior to that of the water-based ink of Example 11 prepared under the same conditions except that any other EO chain-containing nonionic surfactant than the acetylene glycol-based nonionic surfactant was used. Regarding the water-based ink of Example 1 obtained by using the acetylene glycol-based nonionic surfactant which satisfies X=2, in addition to the excellent evaluation result of the quick-drying property, the optical density (OD value) was higher than that of the water-based ink of Example 8 prepared under the same conditions except that the acetylene glycol-based nonionic surfactant which satisfies X=4 was used. Regarding the water-based ink of Example 2 obtained by using, as the EO chain-containing penetrant, a substance containing the butyl group, the evaluation result of the quick-drying property was superior to that of the water-based ink of Example 5 prepared under the same conditions except that a substance containing the methyl group was used as the EO chain-containing penetrant. Regarding the water-based ink of Example 6 in which the average particle size of the pigment was 156 nm, the evaluation result of the optical density (OD value) was very good. On the other hand, regarding each of the water-based inks of Comparative examples 1 to 5 which does not satisfy at least one of the conditions (I) to (III), one or both of the evaluation results of the optical density (OD value) and the strike-through was/were bad.

As described above, the water-based ink of the present teaching can have high optical density (OD value) while preventing the strike-through. The way of use of the water-based ink of the present teaching is not particularly limited, and the water-based ink is widely applicable to various types of ink-jet recording.

What is claimed is:

1. A water-based ink for ink-jet recording, comprising:
   a pigment;
   water;
   a nonionic surfactant having an ethylene oxide chain;
   an anionic surfactant having an ethylene oxide chain; and a penetrant having an ethylene oxide chain,
wherein the nonionic surfactant is an acetylene glycol-based nonionic surfactant represented by the following (1):

in the formula (1), m and n are identical to each other or are different from each other, and m and n are integers satisfying m+n=1 to 15, and each of $R^1$, $R^2$, $R^3$, and $R^4$ is a straight or branched chain alkyl group having 1 to 5 carbon atoms, and $R^1$, $R^2$, $R^3$, and $R^4$ are identical to one another or are different from one another;
the penetrant is ethylene glycol ether represented by the formula (2):

$$R^5O(CH_2CH_2O)_{n1}R^6 \qquad (2)$$

in the formula (2), n1 is 1 to 10, $R^5$ and $R^6$ are identical to each other or are different from each other, $R^5$ is a straight or branched chain alkyl group having 1 to 4 carbon atoms, and $R^6$ is hydrogen or a straight or branched chain alkyl group having 1 to 4 carbon atoms;
a weight ratio (A/N) of a blending amount (A) of the anionic surfactant to a blending amount (N) of the nonionic surfactant is 20/100 to 100/100;
the nonionic surfactant, the anionic surfactant, and the penetrant satisfy the following conditions (I) to (III); and
X is 2 to 5, Y is 3 to 5, and Z is 3 to 5 in the conditions (I) to (III)

$-1 \leq X-Y \leq 1$   condition (I):

$-1 \leq Y-Z \leq 1$   condition (II):

$-1 \leq Z-X \leq 1$   condition (III):

X: an average value of the number of ethylene oxide groups in the ethylene oxide chain of the nonionic surfactant
Y: an average value of the number of ethylene oxide groups in the ethylene oxide chain of the anionic surfactant
Z: an average value of the number of ethylene oxide groups in the ethylene oxide chain of the penetrant.

2. The water-based ink for ink-jet recording according to claim 1, wherein X is 2.

3. The water-based ink for ink-jet recording according to claim 1, wherein the penetrant contains an alkyl group having carbon atoms of not less than 3.

4. The water-based ink for ink-jet recording according to claim 1, wherein the pigment has an average particle size of 140 nm to 160 nm.

5. The water-based ink for ink-jet recording according to claim 1, wherein the pigment is a self-dispersible pigment.

6. The water-based ink for ink-jet recording according to claim 1, wherein the pigment is a self-dispersible pigment modified by a carboxyl group.

7. The water-based ink for ink-jet recording according to claim 1, wherein 7% by weight or more of the pigment is contained in the water-based ink.

8. The water-based ink for ink-jet recording according to claim 1, wherein 7 to 10% by weight of the pigment is contained in the water-based ink.

9. The water-based ink for ink-jet recording according to claim 1, wherein the pigment has an average particle size of 140 nm to 160 nm, and 7 to 10% by weight of the pigment is contained in the water-based ink.

10. The water-based ink for ink-jet recording according to claim 1, wherein a weight ratio (N/Pig) of a blending amount (N) of the acetylene glycol-based nonionic surfactant to a blending amount (Pig) of the pigment is 3.5/100 to 17/100.

11. The water-based ink for ink-jet recording according to claim 1, wherein a weight ratio (P/N) of a blending amount (P) of the penetrant to a blending amount (N) of the nonionic surfactant is 200/100 to 2000/100.

12. The water-based ink for ink-jet recording according to claim 1, further comprising 10 to 30% by weight of glycerol.

13. The water-based ink for ink-jet recording according to claim 1, further comprising glycerol,
wherein a weight ratio (G/Pig) of a blending amount (G) of the glycerol to a blending amount (Pig) of the pigment is 2.5 to 3.4.

14. An ink cartridge comprising the water-based ink for ink-jet recording as defined in claim 1.

15. An ink-jet recording method, comprising:
preparing a water-based ink for ink-jet recording which contains a pigment, water, a nonionic surfactant having an ethylene oxide chain, an anionic surfactant having an ethylene oxide chain and a penetrant having an ethylene oxide chain; and
discharging the water-based ink on a recording medium in accordance with an ink-jet system,
wherein the nonionic surfactant is an acetylene glycol-based nonionic surfactant represented by the following formula (1):

in the formula (1), m and n are identical to each other or are different from each other, and m and n are integers satisfying m+n=1 to 15, and each of $R^1$, $R^2$, $R^3$, and $R^4$ is a straight or branched chain alkyl group having 1 to 5 carbon atoms, and $R^1$, $R^2$, $R^3$, and $R^4$ are identical to one another or are different from one another;
the penetrant is ethylene glycol ether represented by the formula (2):

$$R^5O(CH_2CH_2O)_{n1}R^6 \qquad (2)$$

in the formula (2), n1 is 1 to 10, $R^5$ and $R^6$ are identical to each other or are different from each other, $R^5$ is a straight or branched chain alkyl group having 1 to 4 carbon atoms, and $R^6$ is hydrogen or a straight or branched chain alkyl group having 1 to 4 carbon atoms;

a weight ratio (A/N) of a blending amount (A) of the anionic surfactant to a blending amount (N) of the nonionic surfactant is 20/100 to 100/100;

the nonionic surfactant, the anionic surfactant, and the penetrant satisfy the following conditions (I) to (III); and X is 2 to 5, Y is 3 to 5, and Z is 3 to 5 in the conditions (I) to (III)

$$-1 \leq X-Y \leq 1 \quad \text{condition (I):}$$

$$-1 \leq Y-Z \leq 1 \quad \text{condition (II):}$$

$$-1 \leq Z-X \leq 1 \quad \text{condition (III):}$$

X: an average value of the number of ethylene oxide groups in the ethylene oxide chain of the nonionic surfactant Y: an average value of the number of ethylene oxide groups in the ethylene oxide chain of the anionic surfactant Z: an average value of the number of ethylene oxide groups in the ethylene oxide chain of the penetrant.

16. The water-based ink for ink-jet recording according to claim 1, wherein the anionic surfactant has a straight or branched chain alkyl group having 10 to 14 carbon atoms, and ether sulfuric acid ester salt.

17. The water-based ink for ink-jet recording according to claim 1, wherein the anionic surfactant is sodium polyoxyethylene alkyl ether sulfate.

* * * * *